United States Patent
Williams et al.

[19]

[11] Patent Number: 6,089,504
[45] Date of Patent: Jul. 18, 2000

[54] SINGLE ENGINE AIRCRAFT

[75] Inventors: Samuel B. Williams, Bloomfield Hills, Mich.; Elbert L. Rutan, Mojave, Calif.

[73] Assignee: Williams Internaitonal Co., L.L.C., Walled Lake, Mich.

[21] Appl. No.: 08/898,138

[22] Filed: Jul. 22, 1997

Related U.S. Application Data

[63] Continuation-in-part of application No. 08/897,771, Jul. 21, 1997.

[51] Int. Cl.[7] .............................. B64B 1/24; B64D 27/00; B64C 15/00
[52] U.S. Cl. .............................. 244/53 B; 244/55; 244/15
[58] Field of Search .................................. 244/53 B, 54, 244/55, 15, 119; D12/343

[56]  References Cited

U.S. PATENT DOCUMENTS

| | | | |
|---|---|---|---|
| 2,995,320 | 8/1961 | Gottschalk | 244/15 |
| 3,455,523 | 7/1969 | Hertel | 244/55 |
| 3,938,761 | 2/1976 | Hempenstall | 244/55 |
| 5,114,097 | 5/1992 | Williams | 244/53 B |

FOREIGN PATENT DOCUMENTS 704525   2/1965   Canada ..................................... 244/15

*Primary Examiner*—Charles T. Jordan
*Assistant Examiner*—Patricia L. Zuniga
*Attorney, Agent, or Firm*—Lyon, P.C.

[57] ABSTRACT

A jet aircraft has a generally cylindrical fuselage section defining a passenger compartment and a generally conical aft fuselage section having a maximum lateral dimension substantially smaller than the lateral dimension of the fuselage section. A propulsion engine is mounted on the vertical stabilizer of the fuselage and has an air inlet disposed entirely within a rearward projection of the fuselage passenger compartment to preclude the ingestion of foreign objects into the engine.

3 Claims, 2 Drawing Sheets

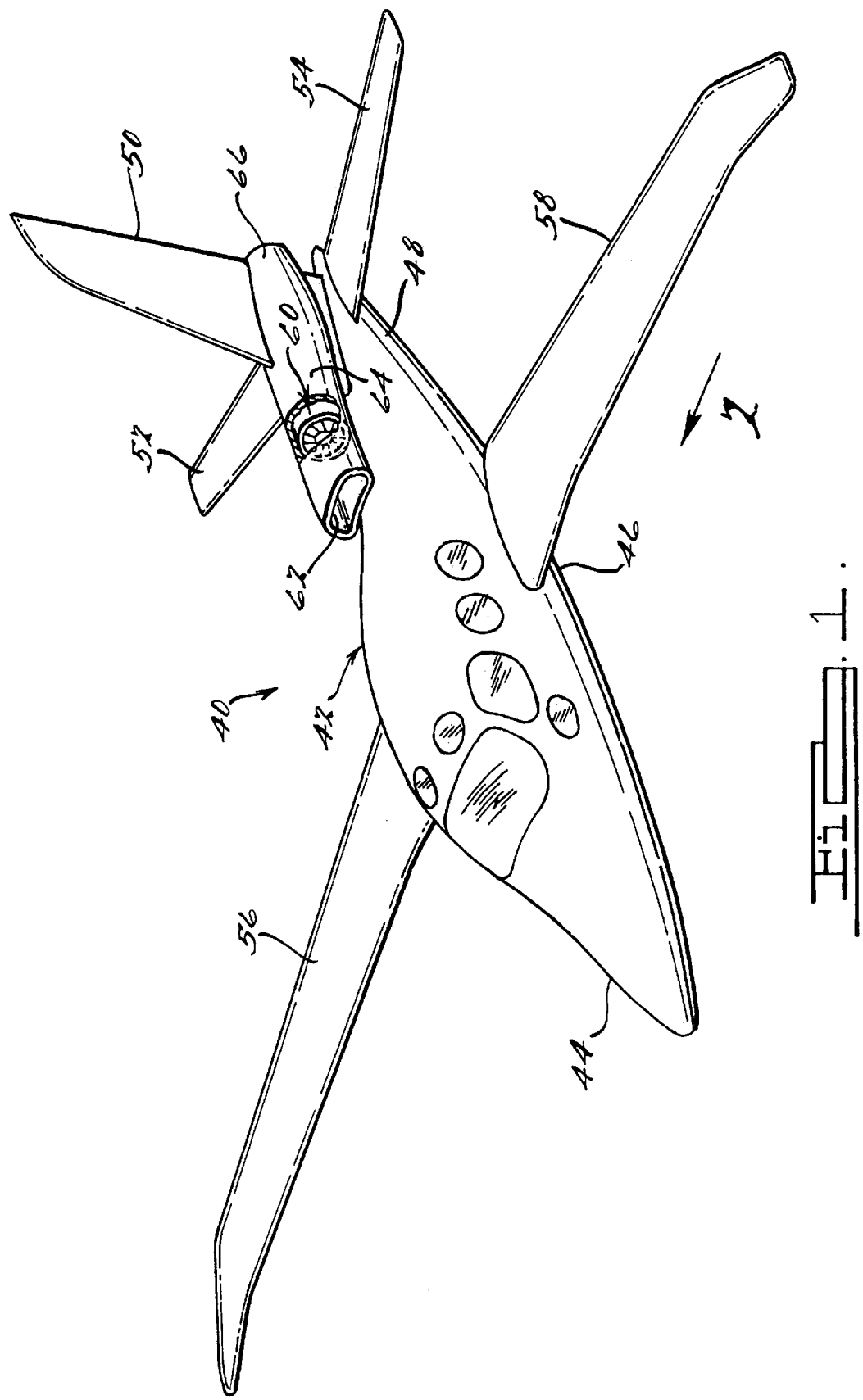

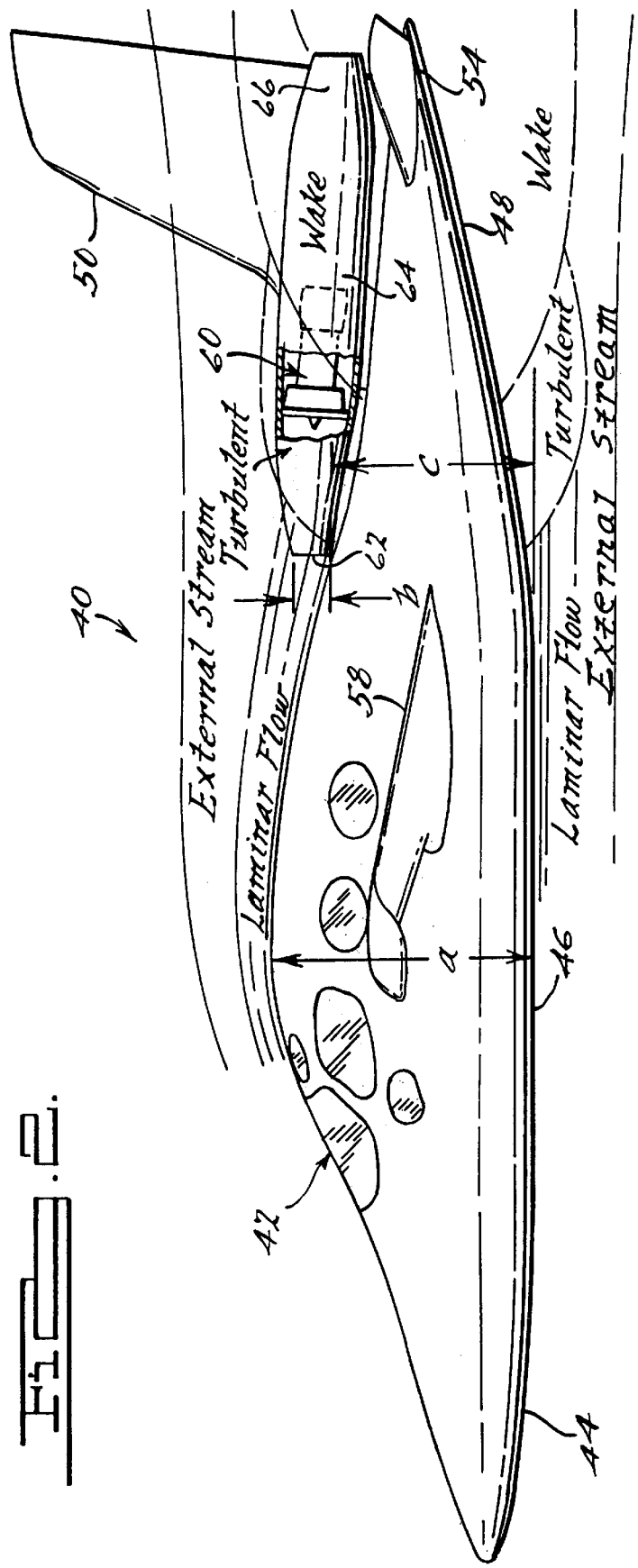

SINGLE ENGINE AIRCRAFT

This application is a continuation-in-part of application Ser. No. 08/897,771, filed Jul. 21, 1997.

The present invention relates to an aircraft having an airframe configuration and engine orientation that precludes the ingestion of foreign objects, for example, birds, into the aircraft's engine yet exhibits efficient inlet air flow to the engine.

BACKGROUND OF THE INVENTION

Turbo fan powered aircraft are required to cruise for considerable distances at high speed. Thus, propulsion system efficiency of the aircraft must be maximized. On the other hand, the propulsion system of the aircraft must be capable of ingesting foreign objects without engine damage. The problem of foreign object ingestion has been solved in the past by merely increasing the strength of the engine components exposed to impact damage. However, strength can be equated with weight, which, in turn, compromises performance of the aircraft. Reconciliation of such seemingly divergent performance and safety requirements requires careful integration of the aircraft's propulsion system with airframe aerodynamics.

The basic model of air flow past an aircraft fuselage assumes that a relatively thin region adjacent the aircraft's fuselage termed the "boundary layer" exists in several states, namely, laminar, turbulent, wake and an external stream. In the laminar state, flow is stratified. Farther aft, laminar flow transforms to a turbulent state which is eddying in character. At the aft end of the aircraft turbulent flow transforms into a wake wherein the direction of flow may actually reverse. The external stream is outboard of each of the aforesaid boundary layer states.

While both laminar and turbulent airflow along the fuselage of an aircraft tend to follow the contour of the fuselage, relatively heavy foreign objects, for example, birds, tend to flow directly rearwardly of the aircraft fuselage in the external stream due to inertial forces if the object is forced into the external stream.

SUMMARY OF THE INVENTION

In accordance with the present invention, the engine air inlet of the disclosed single engine aircraft is positioned relative to the aircraft fuselage so that ingestion of foreign objects into the engine air inlet is precluded while air flow to the engine is maximized. Moreover, while the fuselage configuration and engine orientation of the invention are designed primarily to solve the problem of heavy object ingestion, practice of the invention is effective in eliminating the ingestion of large raindrops which, in turn, protects the engine inlet from rapid ice accretion as well as eliminating the tendency of heavy rain to cause engine flameout.

Specifically, the single engine jet aircraft of the present invention solves the problem of foreign object ingestion by (a) utilizing a conical aft fuselage section or tail cone that, in the plane of the engine inlet, is significantly smaller in radial cross section than the maximum cross section of the main fuselage and (b) placing the engine air inlet radially inwardly of a rearward projection of the main fuselage cross section thereby placing it radially inwardly of the rearwardly flowing external stream. Preferably, the air inlet is positioned forwardly of the separation point between turbulent flow and the wake and, in an optimum configuration, forwardly of the separation point between laminar and turbulent flow.

In a preferred embodiment, the engine is mounted on the aircraft vertical stabilizer with the engine air intake, nacelle and exhaust cone disposed radially inwardly of the theoretical rearward projection of the lateral cross section of the uppermost portion of the passenger compartment of the aircraft fuselage. Placement of the engine air inlet radially inwardly of the rearwardly projected lateral cross section of the fuselage precludes the entrance of foreign objects moving in the external stream into the engine air inlet. Placement of the engine air inlet forwardly of the separation point between laminar and turbulent flow, as in the preferred embodiment, or in a somewhat less desirable configuration, forwardly of the separation point between turbulent and wake flow, maximizes the induction of relatively dense ram air to the engine.

It is to be noted that the forward portion of the engine nacelle and the air inlet of the engine are cantilevered forwardly from the airfoil-shaped vertical stabilizer in spaced relation to the aft fuselage section to allow boundary layer air to flow therebetween. Further, the engine nacelle encompasses both sides of the vertical stabilizer, tapering at the rear to define an engine exhaust nozzle. The clearance between the engine nacelle and aft fuselage section minimizes the impact of boundary layer turbulence on engine inlet air.

BRIEF DESCRIPTION OF THE DRAWINGS

FIG. 1 is a perspective view of an aircraft in accordance with a preferred embodiment of the present invention.

FIG. 2 is a view taken in the direction of the arrow 2 of FIG. 1.

DETAILED DESCRIPTION OF THE PREFERRED EMBODIMENT(S)

As seen in the drawing, a single engine jet aircraft 40, comprises a fuselage 42 having a generally conical nose section 44, a generally cylindrical center section 46, and a generally conical aft fuselage section or tail cone 48. The aircraft 40 has a conventional vertical stabilizer 50 and conventional horizontal stabilizers 52 and 54. Forwardly swept wings 56 and 58 are joined to the center section 46 of the fuselage 42. The center section 46 of the fuselage has a maximum lateral dimension (a) and the aft fuselage section 48 has a maximum lateral dimension (c).

In accordance with the present invention, a jet engine 60 is mounted on the vertical stabilizer 50 with its inlet 62 disposed in close proximity to the aft end of the center section 46 of the fuselage 42. The engine air inlet 62 has a maximum vertical dimension (b) which lies within a rearwardly projected cross section of the generally cylindrical center section 46 of the fuselage 42 and, therefore, well inwardly of the external air stream. An engine nacelle 64 and exhaust nozzle 66 are also within the rearward projection of the center section 46 of the fuselage 42. The aforesaid dimensional relationship is defined by the equation $A \geq B+C$.

Engine combustion air enters the air inlet duct 62 of the engine 60 without attenuation by wake air flow, or, in most conditions of flight, by turbulent air flow. However, the inertia of heavy objects forced into the external stream by the passenger section 46 of the fuselage 42 precludes ingestion thereof into the air inlet 62. It is to be noted that the engine air inlet 62 and the engine nacelle 64 are cantilevered forwardly from the airfoil-shaped tail surface 50, with clearance provided between the engine nacelle 64 and the aft fuselage section 48 to allow boundary layer air to flow therebetween. The nacelle 64 of the engine 60 extends along both sides of the vertical stabilizer 50, tapering at the rear to define the engine exhaust nozzle 66.

While the preferred embodiment of the invention has been disclosed, it should be appreciated that the invention is susceptible of modification without departing from the scope of the following claim:

We claim:

1. A jet aircraft having an elongated fuselage comprising:
    a forward fuselage section;
    an intermediate fuselage section having a lateral dimension (A);
    an aft fuselage section having a maximum lateral dimension (C);
    a vertical stabilizer extending laterally from said aft fuselage section; and
    a propulsion engine mounted on said vertical stabilizer having an air inlet with a maximum dimension (B) said air inlet being disposed entirely within a rearward projection of the lateral cross section of said intermediate fuselage section, whereby the fuselage of said aircraft complies with the equation $A \geq B+C$.

2. The aircraft of claim 1 wherein the air intake of said engine is cantilevered forwardly from said vertical stabilizer toward the intermediate fuselage section of the aircraft.

3. The aircraft of claim 2 wherein said engine has a nacelle that is laterally spaced from said aft fuselage section.

* * * * *